United States Patent [19]

Omoda et al.

[11] Patent Number: 4,680,730
[45] Date of Patent: Jul. 14, 1987

[54] STORAGE CONTROL APPARATUS

[75] Inventors: Koichiro Omoda, Sagamihara; Shigeo Nagashima, Hachioji, both of Japan

[73] Assignee: Hitachi, Ltd., Tokyo, Japan

[21] Appl. No.: 629,042

[22] Filed: Jul. 9, 1984

[30] Foreign Application Priority Data

Jul. 8, 1983 [JP] Japan .................. 58-123245

[51] Int. Cl.⁴ .................. G06F 12/06; G06F 9/18
[52] U.S. Cl. .................. 364/900; 364/200
[58] Field of Search .................. 364/200, 900, 736

[56] References Cited

U.S. PATENT DOCUMENTS

| | | | |
|---|---|---|---|
| 3,781,812 | 12/1973 | Wymore et al. | 364/200 |
| 4,021,779 | 5/1977 | Gardner | 364/200 |
| 4,179,736 | 12/1979 | Wilhite | 364/200 |
| 4,399,507 | 8/1983 | Cosgrove et al. | 364/200 |
| 4,435,765 | 3/1984 | Uchida et al. | 364/200 |
| 4,580,240 | 4/1986 | Watanabe | 364/900 |

Primary Examiner—E. S. Matt Kemeny
Assistant Examiner—Randy W. Lacasse
Attorney, Agent, or Firm—Antonelli, Terry & Wands

[57] ABSTRACT

In a storage control apparatus only vector elements indicated as write data by a corresponding mask information among the vector elements stored in a storage device are stored to the pertinent memory locations of a desired vector register in the vector processor based on the mask information which indicates whether or not the write operation is required (for example, "1" indicates that the write operation is necessary and "0" indicates that the write operation is unnecessary). When the mask information indicates that the write operation is not required, the storage control apparatus controls operations to prevent the memory bank of the main storage from being set to the busy state, thereby eliminating the memory bank conflict which should not take place in accordance with the intrinsic system characteristics.

15 Claims, 19 Drawing Figures

| BANK 1 | BANK 2 | BANK 3 | BANK 4 | BANK 5 | BANK 6 | BANK 7 | BANK 8 |
|---|---|---|---|---|---|---|---|
| 0000 | 0008 | 0010 | 0018 | 0020 | 0028 | 0030 | 0038 |
| 0040 | 0048 | 0050 | 0058 | 0060 | 0068 | 0070 | 0078 |
| 0080 | 0088 | 0090 | 0098 | 00A0 | 00A8 | 00B0 | 00B8 |
| ... | ... | ... | ... | ... | ... | ... | ... |

STORAGE CONTROL APPARATUS

The present invention relates to a storage control apparatus for controlling operations to access a register or memory data in a vector processor or the like which is able to perform a high-speed vector operation.

FIG. 1 depicts an example of a FORTRAN program which contains a DO loop having a conditional statement and which is commonly utilized in a scientific calculation.

The DO loop is processed in an ordinary vector processor as illustrated in FIG. 2. First, each vector element of a vector A(1-n) comprising the vector elements A(1), A(2), . . . , A(n) stored in the main storage is sequentially read and is stored in a vector register VR$\phi$(1-n), respectively.

Then, each vector element of VR$\phi$(1-n) is compared with a constant data "0.0" by use of an arithmetic circuit associated with the vector register VR$\phi$(1-n). If the compared data items are equal to each other, a bit "1" is stored as a mask information bit in the corresponding one of the memory locations VMR0(1), VMR0(2), . . . , VMR0(n) of the vector mask register VMR$\phi$(1-n). If they are unequal, a bit "0" is stored in the corresponding memory location in the same way. Next, each vector element of the vectors C(1-n) and D(1-n) is sequentially read out in a similar manner and is stored in a corresponding one of the vector registers VR1(1-n) and VR2(1-n), respectively.

Each memory location of VR1(1-n), VR2(1-n), and VMR$\phi$(1-n) is then sequentially read out. If the content of the memory location of VMR$\phi$(1-n) is "1", the content of the corresponding memory location of vector register VR2(1-n) is stored in the corresponding memory location of vector register VR3(1-n). If the content of the VMR$\phi$(1-n) memory location is "0", the content of the corresponding memory location of vector VR1(1-n) is stored in the corresponding register of vector register VR3(1-n). Finally, the contents of vector register VR3(1-n) are written in the operand B(1-n) on the main storage.

In the operation ⓒ in FIG. 2, the write operation to vector register VR1 is naturally unnecessary in the vector data C(1-n) read operation for the vector element of which the corresponding vector mask information bit of the vector mask register VMR$\phi$(1-n) is "1". Similarly, this is also the case in the vector data D(1-n) read operation ⓓ for the data of which the corresponding mask information bit of the vector mask register VMR$\phi$(1-n) is "0". In these operations, there have been problems that a number of registers are required because of the unnecessary vector element read operations and that a loss time appears due to read operations of unrequired vector elements from the main storage.

Accordingly, it is an object of the present invention to provide a storage control apparatus which executes the processing with a satisfactory performance by controlling the storage so that only the vector elements necessary for the processing are selected from all the vector elements stored in the main storage and are written in the corresponding memory locations of a vector register.

The present invention will be apparent from the following detailed description taken in conjunction with the accompanying drawings, in which:

FIG. 7 is a table outlining the correspondences between the memory addresses and banks in the embodiment of FIG. 4;

Figure 12:
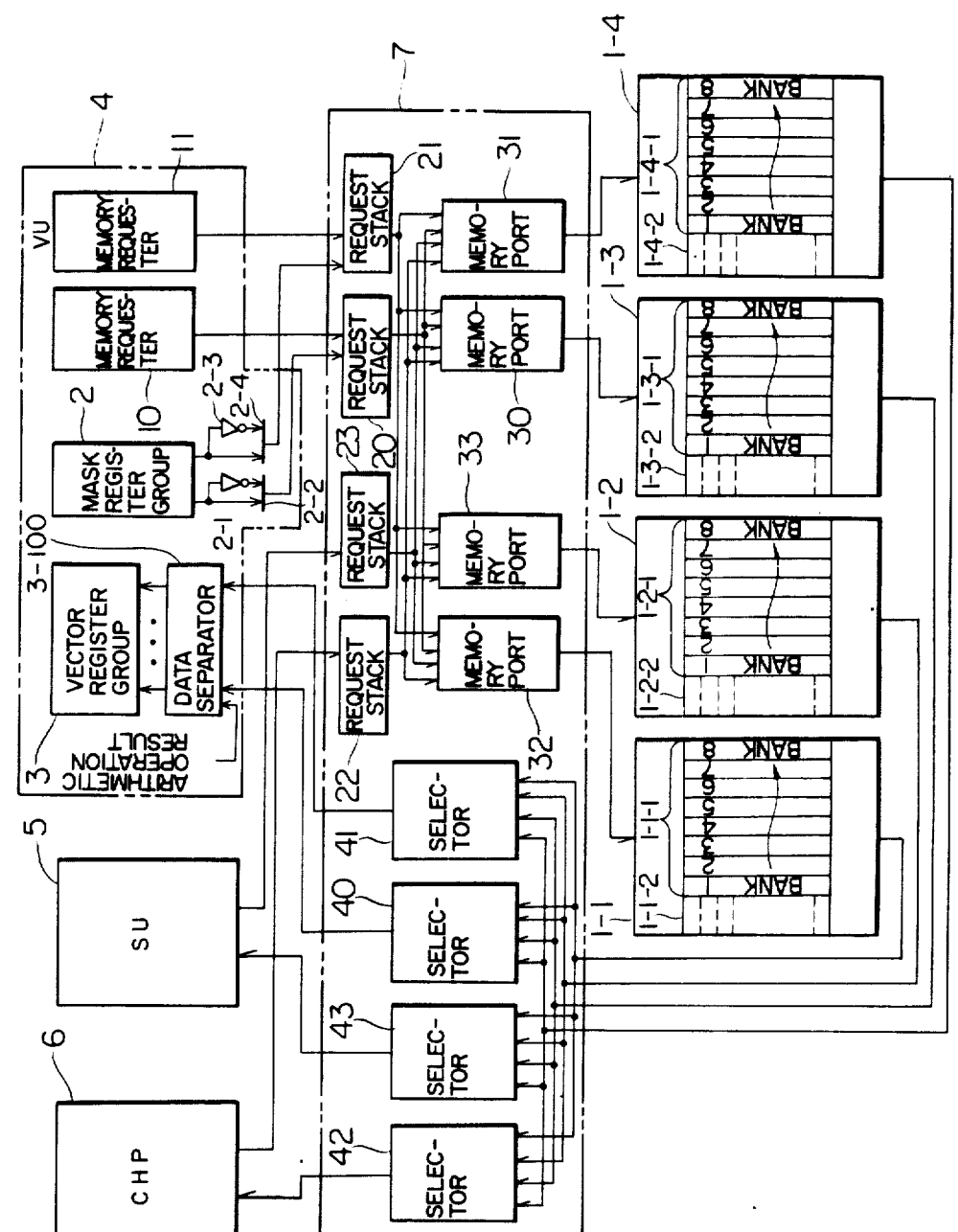
FIG. 12 depicts a simplified configuration of another embodiment in accordance with the present invention.
Figure 14A:
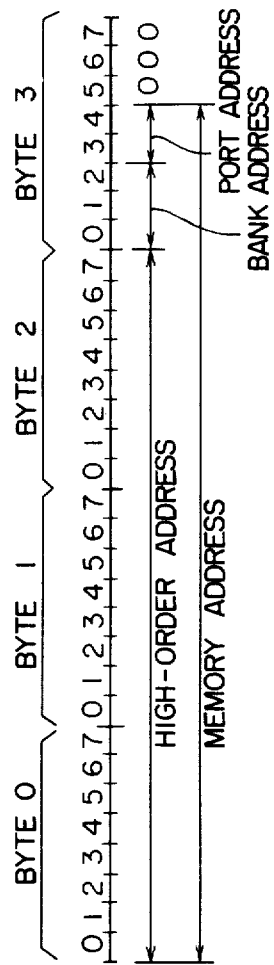
Figure 14B:
Figure 14C:
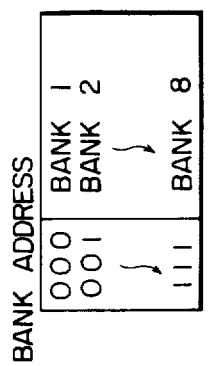
Figure 15:
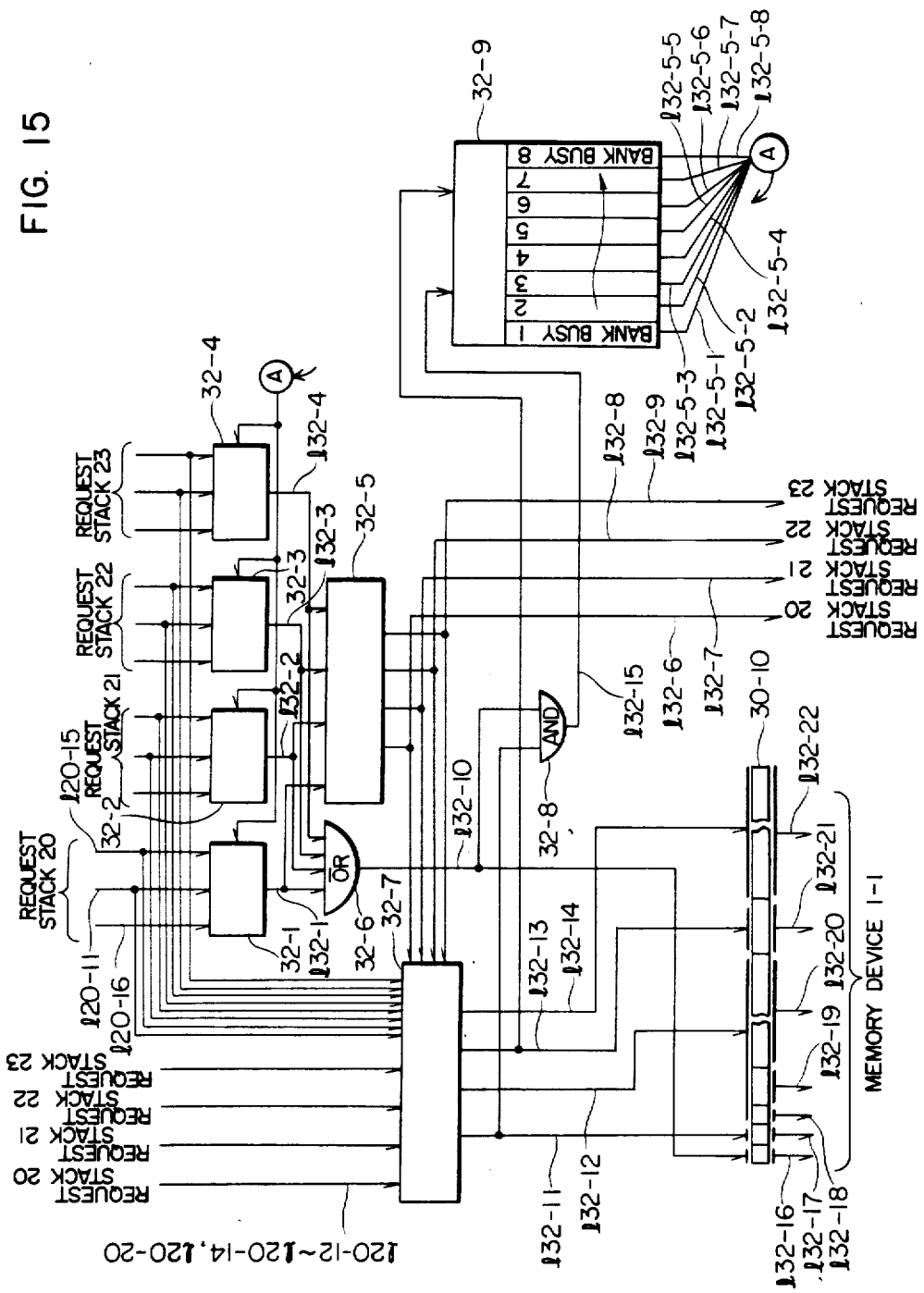
Figure 16:
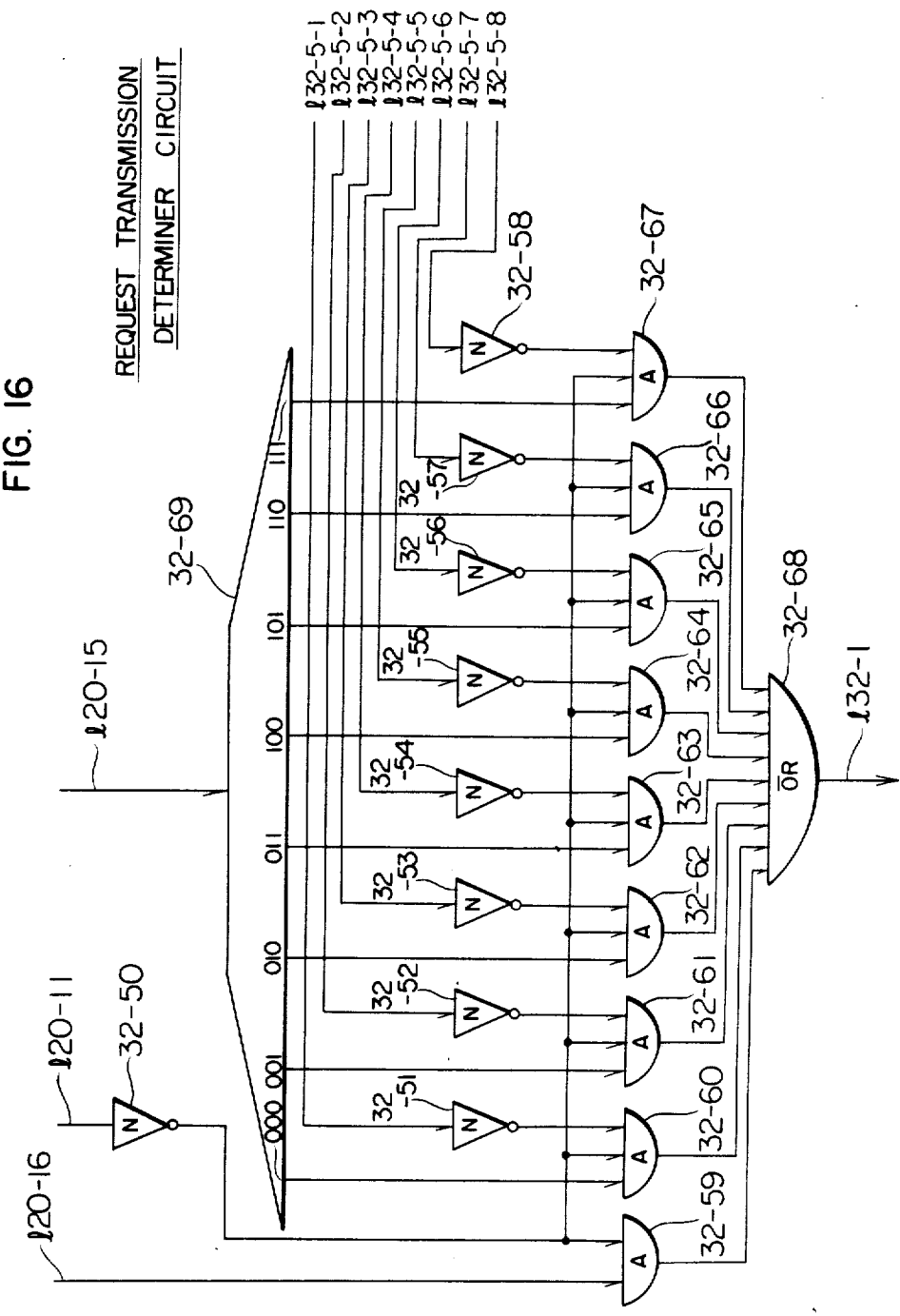
Figure 17:
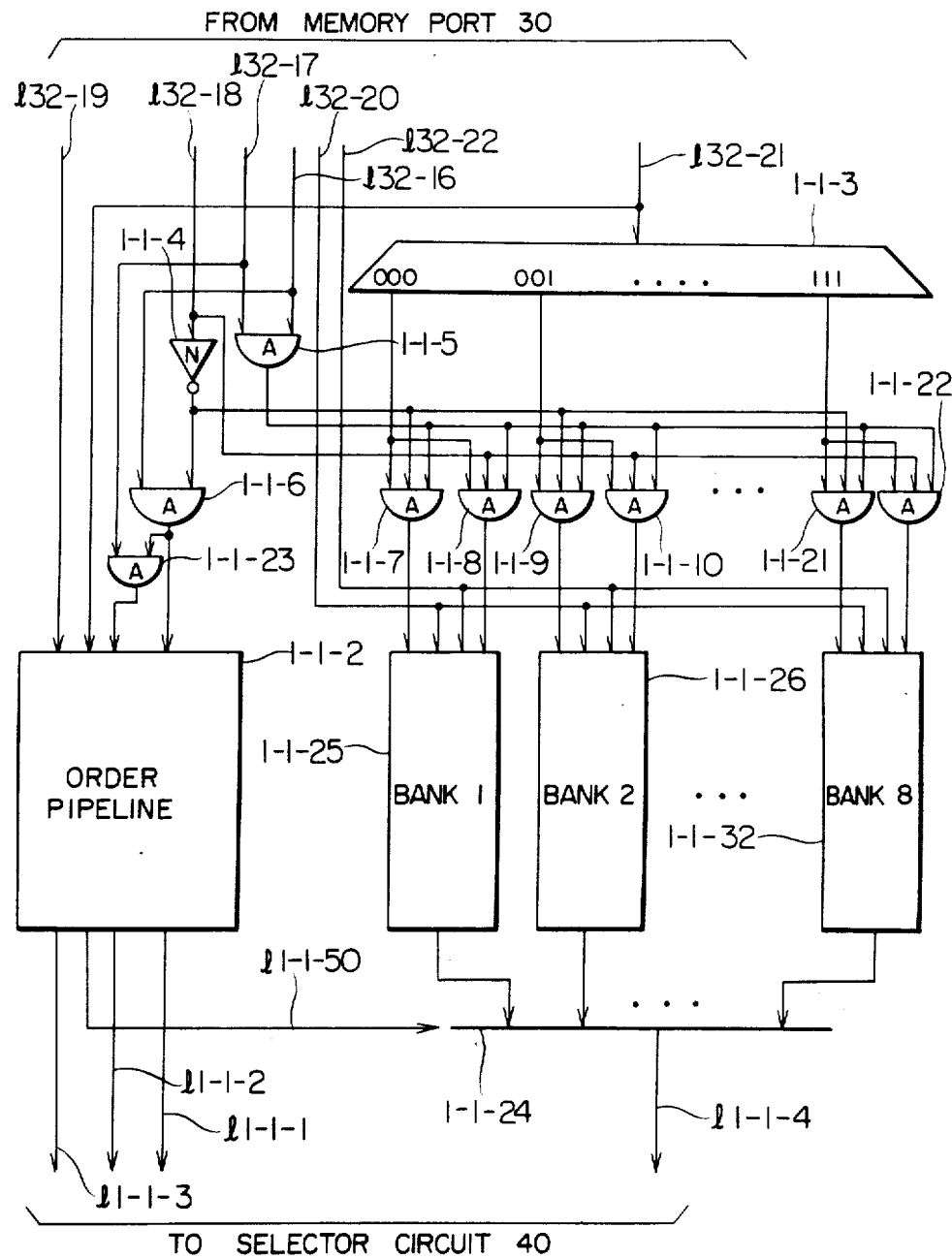

FIGS. 14a, 14b, and 14c illustrate information for the memory request addresses in the embodiment of FIG. 12;

FIG. 15 is a block diagram depicting the configuration of the memory port in the embodiment of FIG. 12;

FIG. 16 illustrates a schematic diagram of the configuration of the request transmission determiner circuit in the embodiment of FIG. 12; and FIG. 17 is a diagram illustrating the configuration of the memory unit in accordance with the embodiment of FIG. 12.

Figures 1, 2:
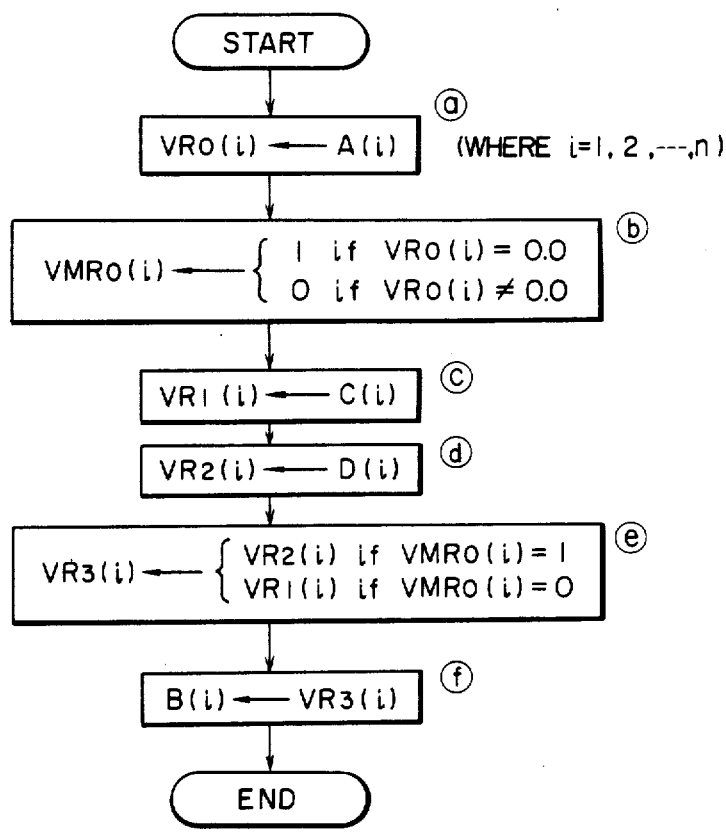
FIG. 1 is a program example commonly used in a computer system.
FIG. 2 depicts a flowchart of procedures for processing the program shown in FIG. 1 by use of an ordinary vector processor.
Figure 3:
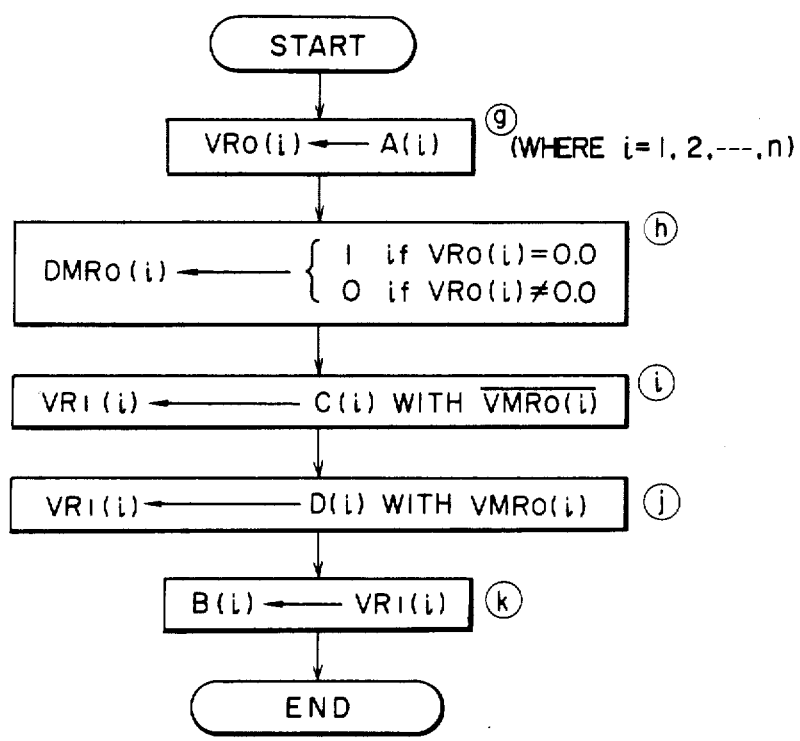
FIG. 3 is a flowchart of procedures employed to process the program of FIG. 1 with a vector processor to which the present invention is applied.

FIG. 3 is a flowchart of procedures for executing the program example of FIG. 1 in the processing system in accordance with the present invention.

Steps ⓖ, ⓗ, and ⓚ are identical to steps ⓐ, ⓑ, and ⓕ in FIG. 2 excepting that VR3 in step ⓕ of FIG. 2 corresponds to VR1 in step ⓚ of FIG. 3. That is, the vector registers VR2 and VR3 utilized in FIG. 2 may be omitted in the processing of FIG. 3. Referring to FIG. 3, when the vector data is read in step ⓘ, only the vector elements of which the corresponding mask information bit of the vector mask register VMR$\phi$(1-n) is "0", that is, only the valid data elements are stored in the corresponding memory locations of the vector register VR1(1-n). In step ⓙ, when the vector data D(1-n) is read, only the vector elements of which the corresponding mask information of VMR$\phi$(1-n) is "1" are stored in the corresponding memory locations of VR1(1-n). In step ⓚ finally, the contents of VR1(1-n) are written in the operand B(1-n) on the main storage, thereby implementing the execution of the processing equivalent to that of FIG. 1.

Figure 4:
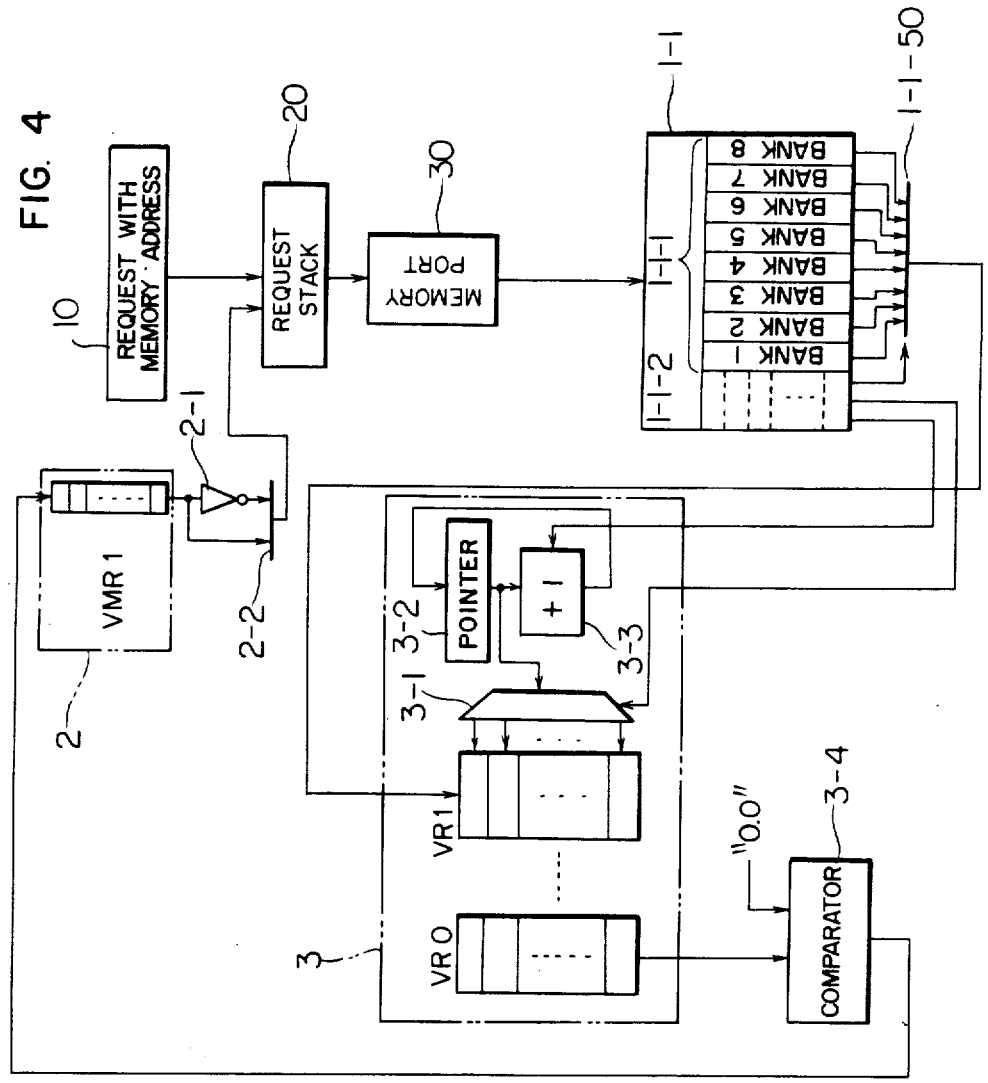
FIG. 4 illustrates a schematic block diagram of an embodiment of the present invention.

FIG. 4 illustrates a schematic diagram of the configuration of an embodiment in accordance with the present invention. This arrangement comprises a memory device 1-1, a main storage device 1-1-1 including eight different memory banks, an order pipeline 1-1-2, a selector 1-1-50, a mask register section 2, an inverter circuit 2-1, a selector 2-2, a vector register section 3, a decoder 3-1, a register address pointer 3-2, a plus-one circuit 3-3, a comparator circuit 3-4, a request stack or buffer 20, and a memory port 30. At the input of the request stack 20, a memory requester 10 as shown in FIG. 12 is provided for sequentially generating the read address and the read request.

Figure 5:
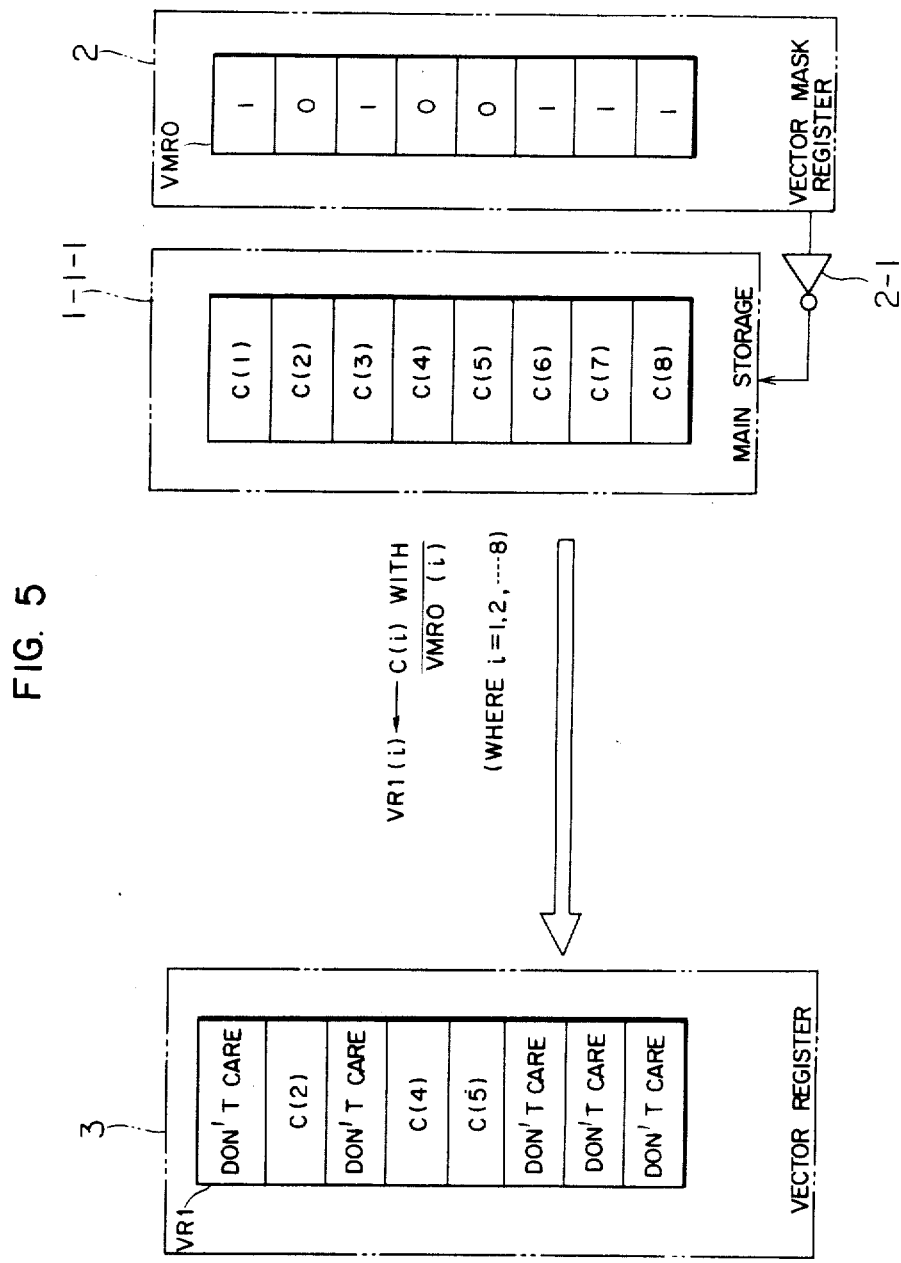
FIG. 5 depicts a conceptual diagram illustrating the procedure for transferring the vector data from the main storage to the vector register in the embodiment of FIG. 4.

FIG. 5 illustrates the operations corresponding to step (i) of FIG. 3 in which the vector data C(1-8) stored in the main storage 1-1-1 is sequentially read based on the mask information of each vector element in the mask register VMR$\phi$(1-8) (that is, only the vector elements of which the corresponding mask information value VMR$\phi$(1-8) is "0" are read) and is stored in the vector register VR1. Since the contents of the memory locations of mask register VMR$\phi$ are "0s" for the vector element Nos. 2, 4, and 5 of the vector C(1-8), the mask information inverted by the inverter circuit 2-1 becomes "1" only for these data elements while all vector elements of the vector C are sequentially read. Therefore, only these vector elements need be stored in the corresponding memory locations of the vector register VR1, and the write operation need not be conducted for the other memory locations. In the following paragraphs, explanations will be given in conjunction with the processing schematically illustrated in FIG. 5.

First of all, in the embodiment of FIG. 4, the contents stored in the memory locations VR$\phi$(1), VR$\phi$(2), ..., VR$\phi$(n) of the vector register VR$\phi$ are sequentially read and are compared with the data constant "0.0" by use of the comparator circuit associated with the vector register VR$\phi$. If the compare result indicates VR$\phi$(i)=0.0, a bit "1" is stored in the corresponding memory location of the vector mask register VMR$\phi$ as the mask information bit, otherwise, "0" is stored as the mask information bit.

The request information signals from the vector processor (not shown) comprising the data element read/write request signal with respect to the main storage 1-1-1, memory address, store data (unnecessary for reading data from the main storage), and request order (read/write identification information) are stored in the request stack 20, then they are sequentially transferred to the memory device 1-1 via the memory port 30 in the manner well known in the art. In this case, the mask information of the mask register VMR$\phi$ corresponding to the vector element is read in synchronism with the request signal described above (if necessary, that is, when the processing is equivalent to step (i) of FIG. 3, the read value is inverted by use of the inverter circuit 2-1), then the readout data is stored in the request stack 20 through the selector 2-2. As a result, the mask information thus read out is added as a portion of each request order and is transferred to the memory device 1-1 via the memory port 30.

The memory port 30 identifies the relevant memory address contained in the request information signals read from the request stack 20 and checks the state (presence or absence of the bank busy output signal) of the bank in the memory device 1-1 corresponding to the memory address. If the bank is not in the busy state, the request signals are transmitted to the memory device 1-1 through the request line 132-16; otherwise, the operation is controlled so as to delay the request signal transmission until the busy state is removed.

On receiving the request signal transmitted from the memory port 30, the memory device 1-1 interprets the three low-order bits of the memory address simultaneously transferred and activates the necessary bank of the main storage 1-1-1; further, the memory device 1-1 outputs a read or write instruction signal on the line 132-18 to indicate a read or write operation based on the read/write identification information of the request order. In this embodiment, a read operation is assumed to be indicated if the one-bit read/write identification information contains a value "0"; while a write operation is assumed if it contains a value "1".

When the output signal from the memory port indicates a read request, the control section of the memory device 1-1 transfers the read valid information indicating that there exists a read request for the required vector element, the data valid information from the AND gate 1-1-202 indicating that the read valid information contains a value "1" (ON) and that the mask information passed through the selector 2-2 is "1", and the three low-order bits (bank address information) of the memory address on the line 132-21 to the input of the order pipeline 1-1-2. In this embodiment, the order pipeline comprises a multiplicity of pipeline stages of which the number of stages is equal to the number of cycles which appear from the time when a read operation is initiated on a bank corresponding to the requested vector element to the time when the requested vector element is outputted as read data from the bank.

Based on the three-bit bank address information outputted from the last stage of the order pipeline 1-1-2 to the line l1-1-50, the read data is selected via the selector 1-1-50 and is transferred to the vector register VR1. The read valid information is transferred as the write address update signal to the plus-one circuit 3-3 in the vector register group 3 through the line l1-1-1 and is used to increment the register element address of the register address pointer 3-2 by one (register element updating for storing the subsequent read data). The data valid information is transferred as the write enable signal to the decoder 3-1 in the register section 3 through the line l1-1-2. When the write enable signal is present, the data transferred from the memory device 1-1 is allowed to be stored as the valid data in the corresponding memory location of the register VR1. In this manner, only the valid read data is stored in the relevant memory location of the vector register VR1 specified by the register address pointer 3-2.

Figure 6:
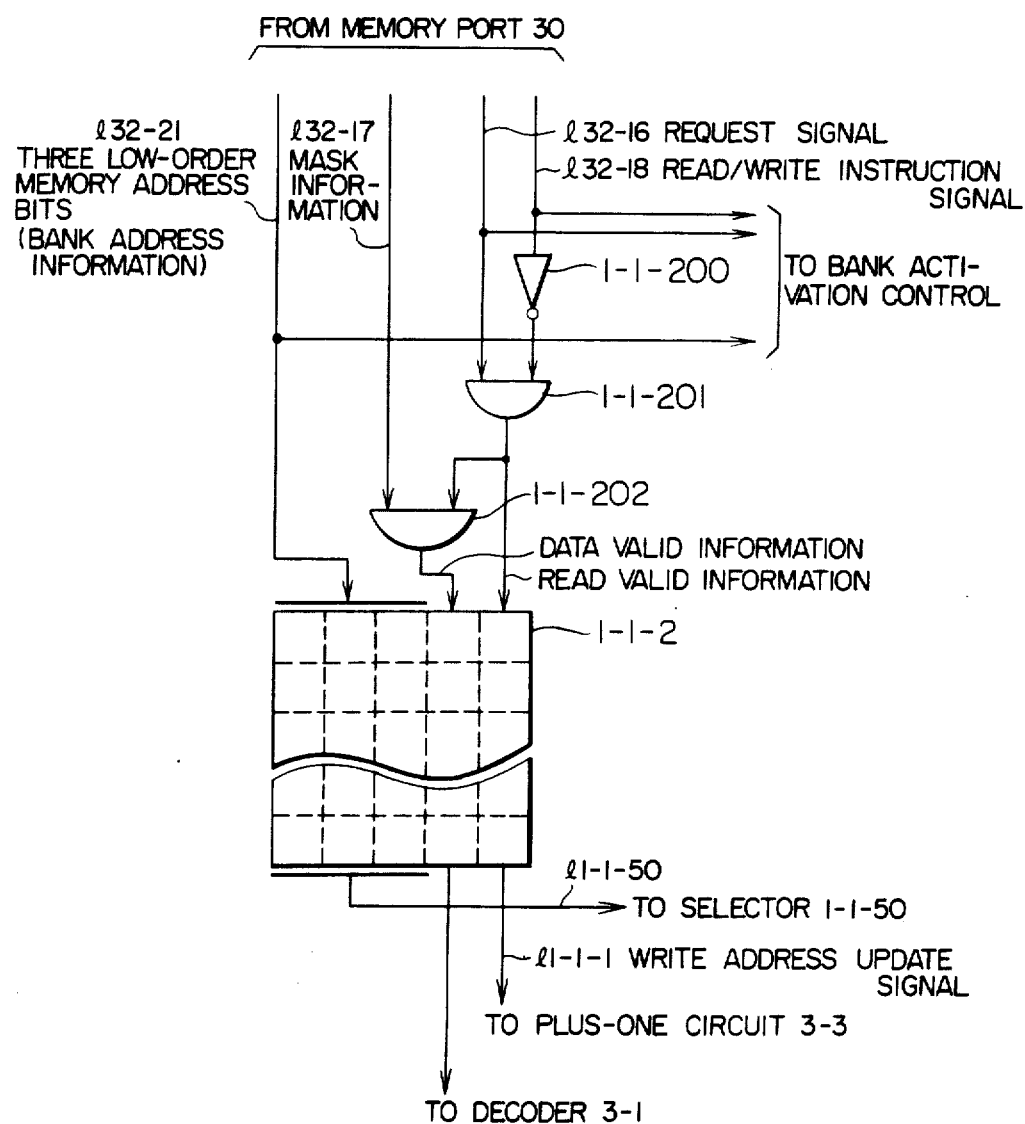
FIG. 6 is a simplified block diagram demonstrating an order pipeline configuration in the embodiment of FIG. 4.

FIG. 6 concretely illustrates the configuration and input/output information of the order pipeline 1-1-2 described above.

Referring to FIG. 6, the circuit arrangement comprises a NOT circuit 1-1-200 and two AND circuits 1-1-201 and 1-1-202. It is assumed that the request information signals are sequentially transmitted from the vector processor (not shown) in the ascending order of the vector element numbers assigned to the vector data and that each vector element is read as the read data from the memory device 1-1 according to this order and only the valid vector elements are stored in the corresponding memory locations of the vector register VR1. Regardless of whether the data read from the memory device 1-1 is valid or invalid, the plus-one circuit 3-3 has been designed to access all the memory locations ranging from the first memory location address to the last memory location address. That is, quite a simple configuration need only be used for the vector register group 3. In this case, since the read data of the vector element of which the corresponding mask information which has passed the selector 2-2 of FIG. 4 is "0" need not be written in the corresponding memory location of the vector register VR1, the write enable signal is not required to be transferred to the decoder 3-1. However, the address update signal for writing the data of the next data element must be transferred to the plus-one circuit 3-3, hence the necessary information is required to be delivered to each stage of the order pipeline 1-1-2 even if the relevant mask information is "0". When the similar precessing is conducted on the vector D, all the desired vector elements can be stored in the vector register VR1. For the write operation on the vector D, the selector 2-2 supplies the value of each memory location of VMR$\phi$ directly to the request stack 20 without passing the value to the inverter circuit 2-1.

Moreover, the configuration of FIG. 6 demonstrating the masked data read operation in accordance with the present invention can be easily modified to be applicable to the ordinary data read operation. That is, to achieve an ordinary data read operation by use of the arrangement depicted in FIG. 6, the mask information from the memory port 30, the AND circuit, and the data valid information selected from various information to be inserted into the order pipeline 1-1-2 becomes unnecessary. In this case, the write address update signal need only be utilized in place of the write enable signal. As described before, the main storage 1-1-1 of this embodiment comprises eight memory banks. Since each bank requires a plurality of cycles in general from the initiation of activation to the termination thereof, a read operation cannot be initiated for the different vector elements in the same bank for each cycle. Therefore, the memory port 30 must issue such a request by checking the bank (busy) state in any case. For the different banks, it becomes possible to issue a request for each cycle.

FIG. 7 shows an example of the correspondence between the memory addresses and banks in the main storage 1-1-1. In this table, each vector element comprises eight bytes (64 bits) and the addresses are indicated in hexadecimal notation.

Figure 8:
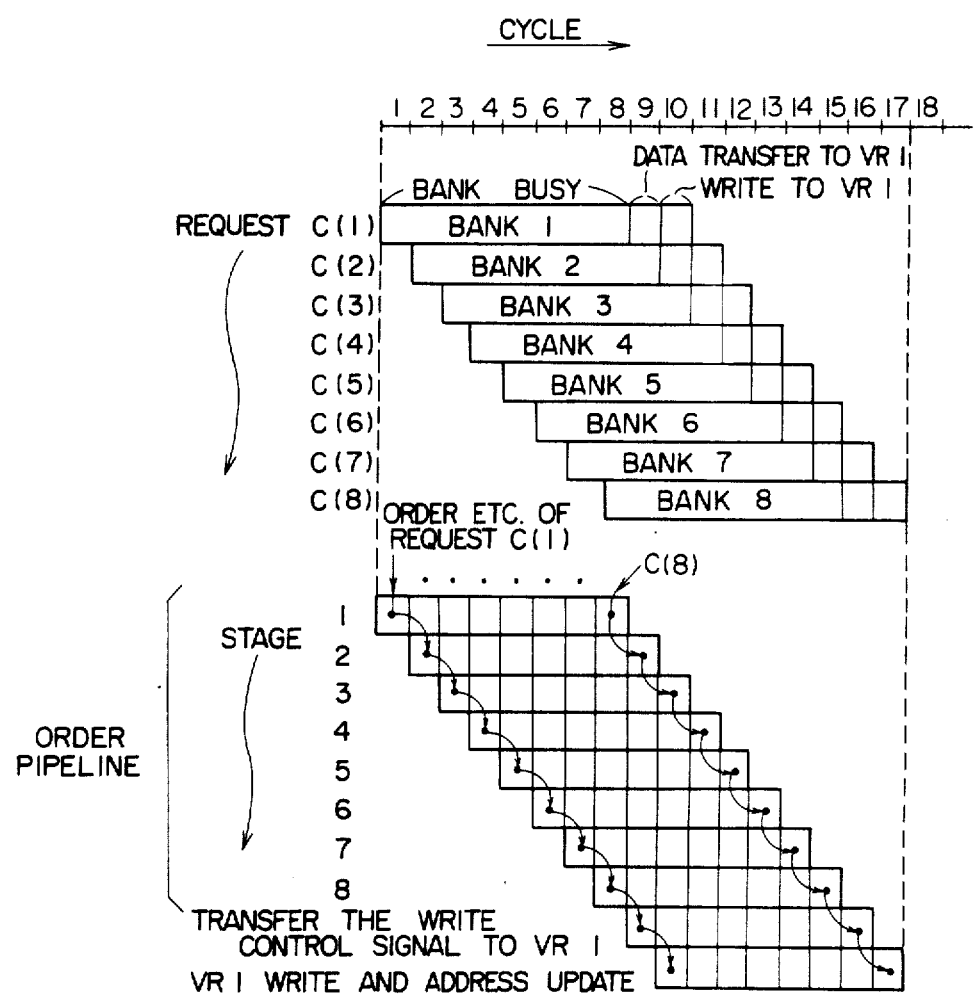
FIG. 8 illustrates a timing chart depicting the sequential read operation of vector data elements from the main storage in accordance with the embodiment of FIG. 4.

FIG. 8 illustrates the operation timing and the write operation timing of the read vector element in the vector register VR1 for the memory device 1-1, where the memory addresses for the vector element request of the vector data C(1-8) are allocated to the banks in the ascending bank number order (bank 1 to bank 8) and the number of stage cycles of the order pipeline 1-1-2 is eight. It is assumed in this diagram that the write control signal represents the before-stated address update signal and write enable signal.

Since the specified banks are different from each other in this situation, the request can be transmitted from the memory port 30 to the memory device 1-1 for each cycle unless there exist any requests from the other requester. Consequently, all the data read operations are completed through 17 cycles.

Figure 9:
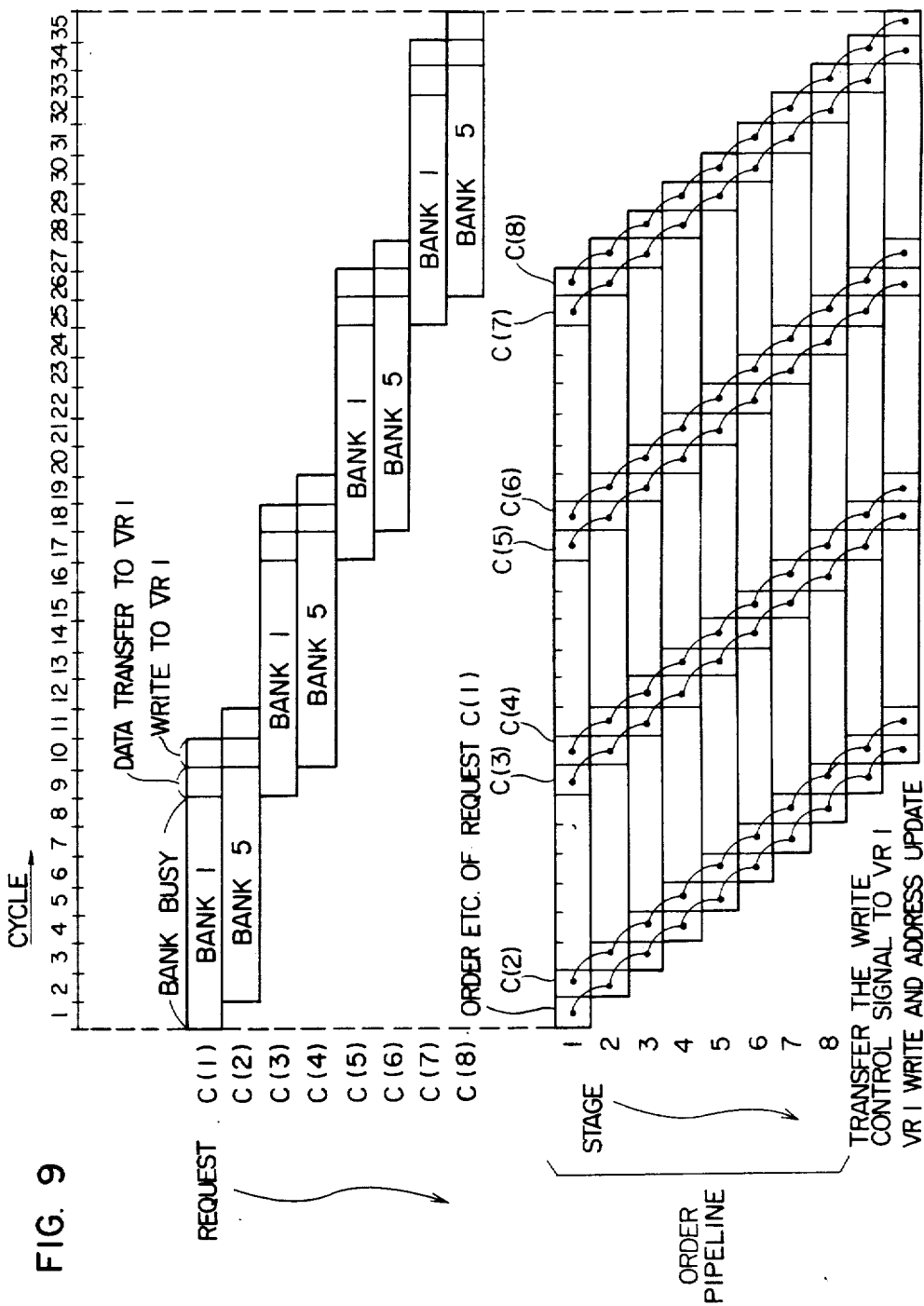
FIG. 9 is a timing chart illustrating procedures to sequentially read vector data elements from the main storage with memory bank conflict in the embodiment of FIG. 4.

FIG. 9 is a schematic diagram depicting similar operation timing as illustrated in FIG. 8, where the banks are allocated in the order of banks 1, 5, 1, 5, 1, 5, 1, and 5 to the memory addresses for the vector element request of vector data C(1-8). Such a bank allocation often occurs in actual vector processing.

Since four requests are issued to the banks 1 and 5, respectively in this case, the request to the memory device 1-1 cannot be transmitted for each cycle, and a loss time of 18 cycles (=35-17) may take place in some cases.

The embodiment of FIG. 4 makes it possible to store only the valid data in the vector register as described before, and the step (e) of FIG. 2 can be eliminated, thus the number of vector registers to be used is reduced. As explained above, an unused cycle may appear due to the difference between memory addresses; furthermore, when there exist several requests from a plurality of requesters, the number of unused cycles is likely to increase due to the conflict among these requests. However, if the time elapsed by the unused cycles is minimized, the memory throughput can be reduced.

When the mask information (which has passed the selector 2-2) corresponding to the vector element for which a read request is accepted is "0", the relevant read data need not be written in the vector register VR1; therefore, the busy information of the bank is not required to be outputted. The write address update signal, however, is required to be transmitted to update the address of the memory location to be written.

In FIG. 4, since the memory port 30 transmits the request signal for this purpose regardless of whether the mask information is "0" or "1" (by assuming that each mask information is "1"), the bank in which the unnecessary vector element is stored becomes busy in some cases, and there exists a bank conflict, hence an unused cycle takes place because the subsequent request cannot be issued.

Figure 10:
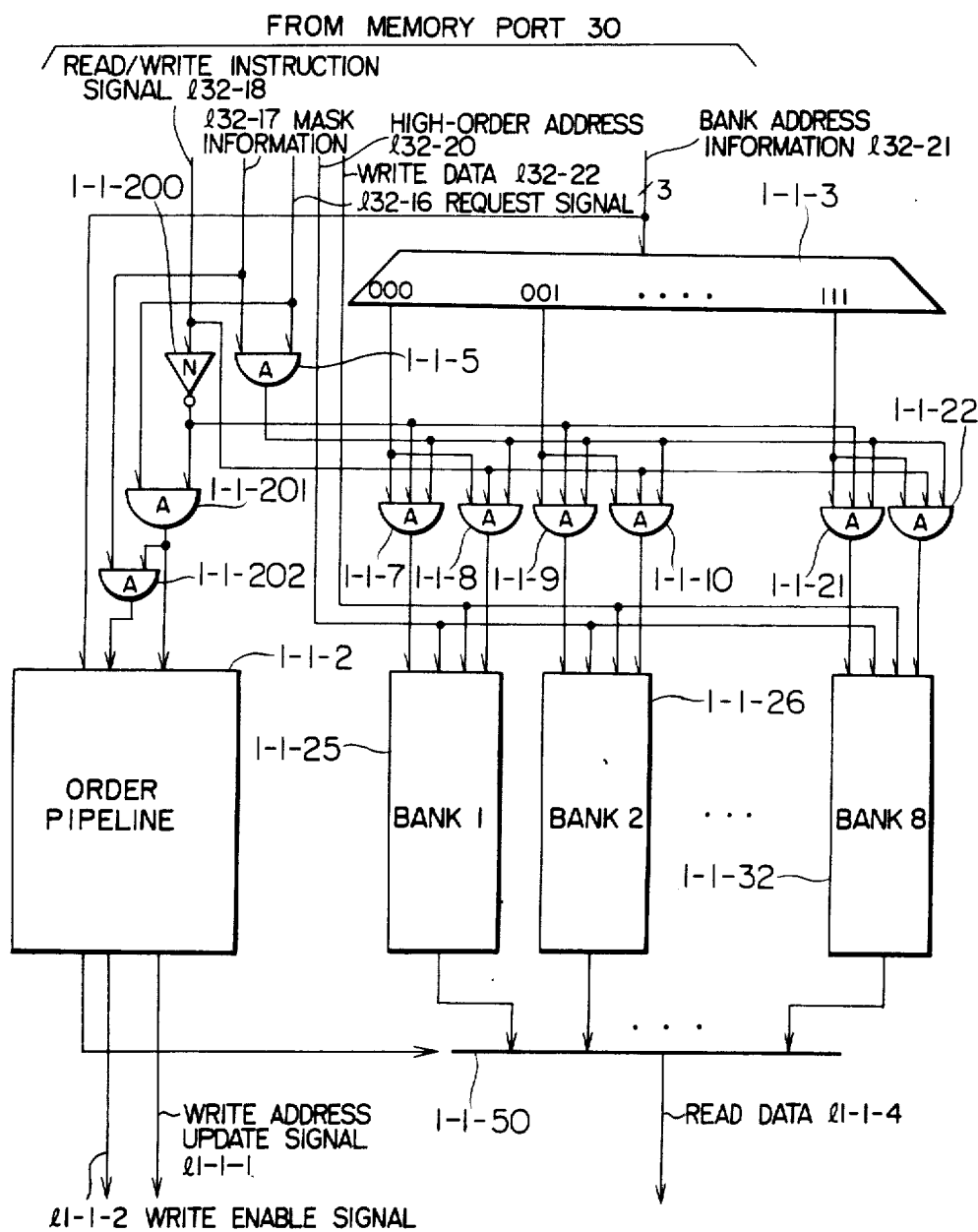
FIG. 10 depicts a schematic block diagram of the modified examples of the main storage and order pipeline in the embodimsent of FIG. 4.

FIG. 10 is an example of a memory device configured to avoid the unnecessary unused cycle, wherein the same reference numerals as those of FIG. 6 indicate the same parts or those having the equivalent functions.

As compared with FIG. 6, the meory banks 1-8 and the bank selector 1-1-3 are additionally illustrated in FIG. 10. Referring to FIG. 10, it is characteristic that the request signal on the line 132-16 and the mask information on the line 132-17 are logically processed by the AND gate 1-1-5 and that the resultant signal is supplied to an input of each of 16 AND gates 1-1-7, 1-1-8, ..., 1-1-22. Consequently, even when a request signal appears, all the AND gates 1-1-7, 1-1-8, ..., 1-1-22 are closed if the mask information is "0". That is, even when a bank is selected by the decoder 1-1-3, the bank is not activated. The bank activation for an unnecessary data element is thus prevented and the undesirable unused cycle does not take place.

Figure 11:
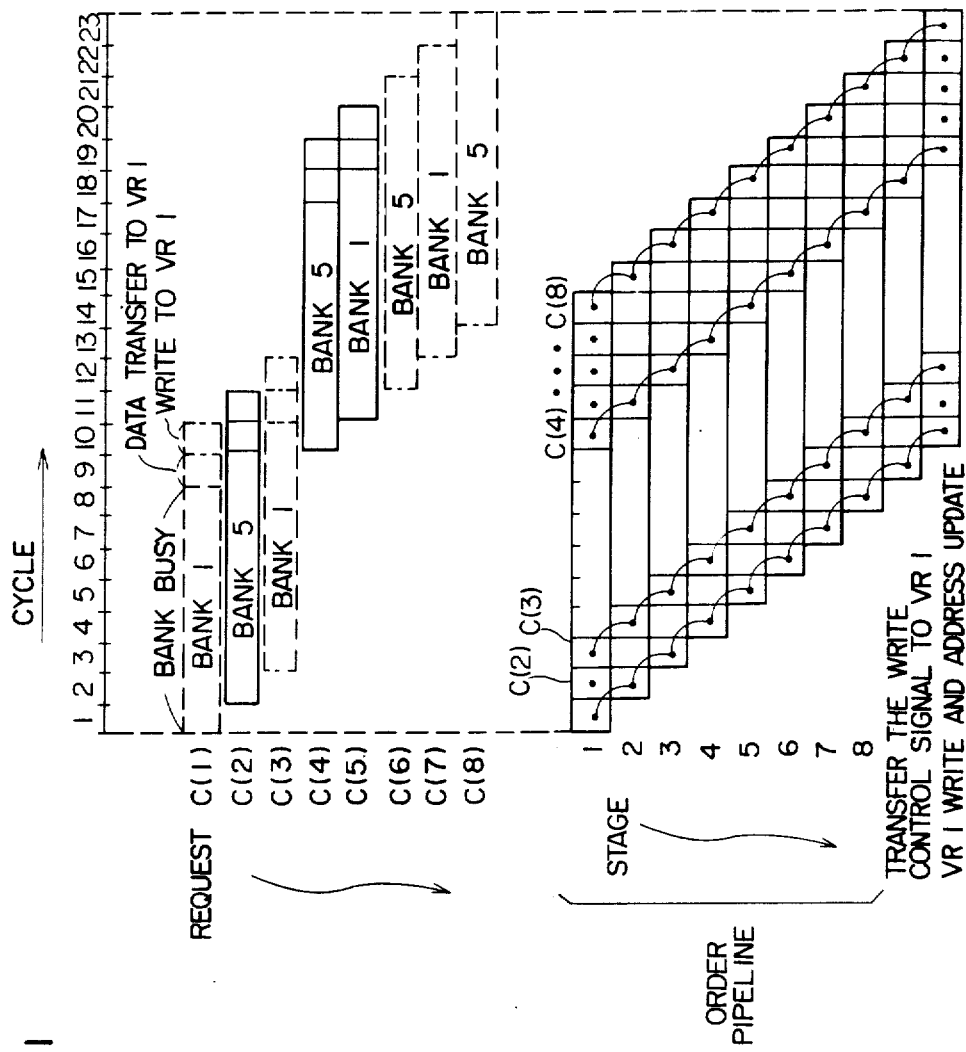
FIG. 11 is a timing chart illustrating the procedure for sequentially reading vector data elements from the main storage to which the configuration of FIG. 10 is applied.

FIG. 11 is the timing chart of the processing conducted by the memory device 1-1 of FIG. 10, where any banks are not set to the busy state if the mask information is "0". To compare the operations between FIGS. 9 and 11, the banks 1, 5, 1, 5, 1, 5, 1 and 5 are assigned in this order, respectively to the memory addresses for the request of vector elements C(1), C(2), ..., C(8). Since the mask information passed through the selector 2-2 is "0" for the request of data element C(1), the bank 1 is not set to the busy state in the first cycle (the banks enclosed with the broken lines will not become busy), the necessary information is transferred to the stage 1 of the order pipeline 1-1-2. The mask information passed through the selector 2-2 is "1" for the C(2) request in the second cycle, hence the bank 5 is made to be busy and the necessary information is delivered to the stage 1 at the same time. Moreover, the relevant information of the vector element C(1) is shifted from the stage 1 to the stage 2.

The mask information is "0" for the vector element C(3) request, thus the necessary information is transferred to the stage 1 in the third cycle subsequent to the C(2) request irrespective of the bank utilization stage. (It is noted that the bank 1 is not set to the busy state in this situation.) At the same time, the necessary information items on the stages 1 and 2 are shifted to the stages 2 and 3, respectively. On the other hand, even when the mask information outputted from the selector 2-1 is "0", the corresponding bank is set to the busy state in FIG. 9, so the C(3) request processing is delayed until the bank 1 which has been made busy with the C(1) request is freed.

In accordance with above-mentioned processing, the number of unused cycles is reduced from 18 (FIG. 9) to 6 (FIG. 11).

FIG. 12 is a simplified configuration illustrating another embodiment in accordance with the present invention, where a plurality of requesters for requesting the vector data read/write operations and a plurality of memory devices are provided. Referring to FIG. 12, the simplified configuration comprises memory devices 1-1 to 1-4, main storage units 1-1-1 to 1-4-1, each consisting of eight banks, order pipelines 1-1-2 to 1-4-2, a mask register group 2 comprising mask registers, NOT circuits 2-1 and 2-3, selectors 2-2 and 2-4, a vector register group 3 comprising vector registers, a data pass select circuit 3-100 for writing the read data in the specified vector register, a vector processing unit (VU)4 for processing the vector instructions, a scalar processing unit (SU)5 for processing the scalar instructions, a channel processor (CHP)6 for processing input/output operations, a memory control unit (MCU)7, and memory requesters 10 and 11. The memory request source is VU4, SU5, CHP6. Request stacks 20 and 21 are used to stack the memory requests from the VU; request stacks 22 and 23 are used to buffer the memory requests from the CHP and SU, respectively; memory ports 30-33 are provided for the memory devices 1-3, 1-4, 1-1, and 1-2, respectively; selector circuits 40 and 41 are used to select from the memory devices 1-1 to 1-4 the read data corresponding to the read request transmitted from the memory requester 10 or 11 of the VU and to transfer the read data to the vector register group 3, and selector circuits 42 and 43 are provided for the CHP and SU, respectively.

Figure 13:
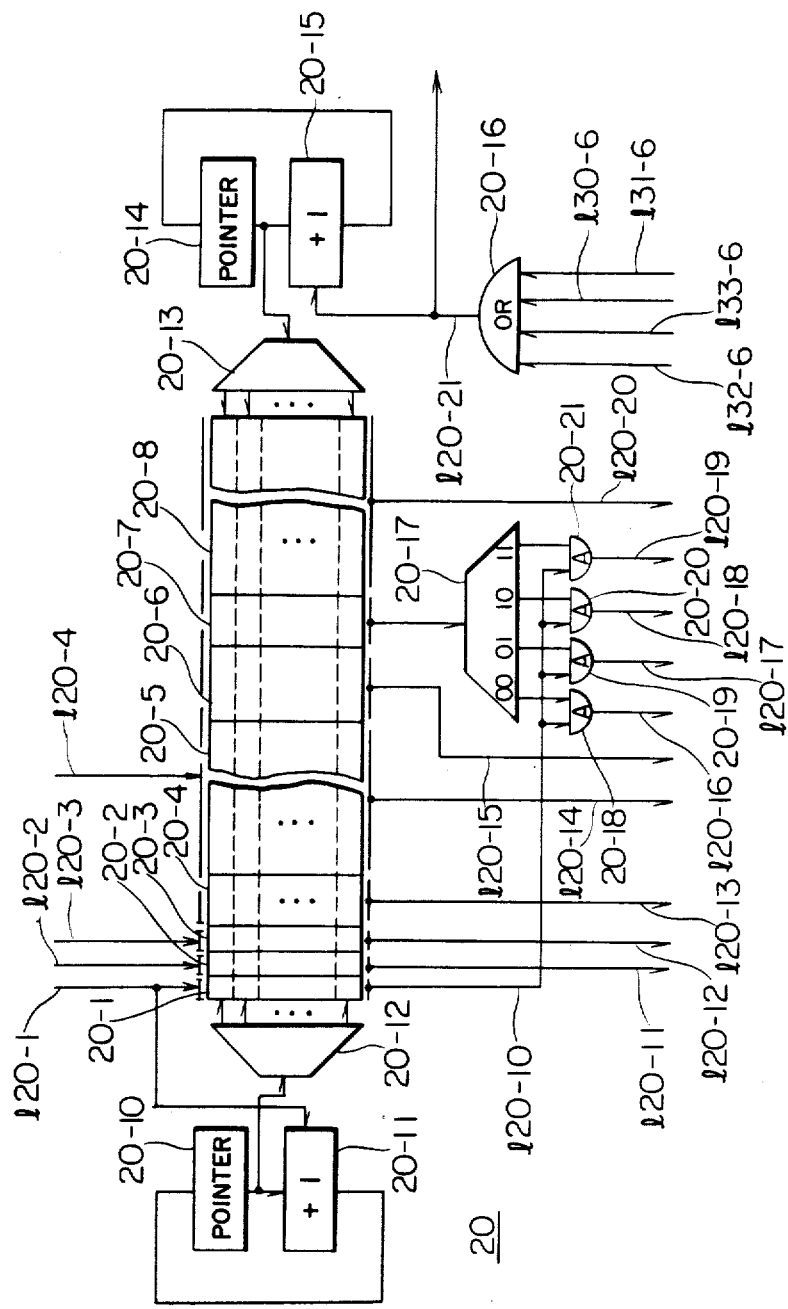
FIG. 13 is a schematic diagram showing the configuration of a request stack in accordance with the embodiment of FIG. 12.

FIG. 13 illustrates the configuration of the request stack 20 (the same configuration is also used for the request stacks 21-23).

The reference numerals 20-1 to 20-8 indicate a stack register group comprising a plurality of stack registers for stacking the request information transferred from the memory requesters through the signal lines 120-1, 120-3, and 120-4 and the mask information transferred from the selector 2-2 via the signal line 120-2; the reference numeral 20-1 indicates a request signal (one bit), the reference numeral 20-2 indicates the mask information (one bit), the reference numeral 20-3 represents the read/write identification information (one bit; "0" for a read operation and "1" for a write operattion), the reference numeral 20-4 indicates the access request source information (two bits; for example, "00" for the VU memory requester 10, "01" for the VU memory requester 11, "10" for the SU, and "11" for the CHP; the reference numeral 20-5 represents the high-order address for specifying a memory position in the specified bank, the reference numeral 20-6 indicates a bank address (three bits), the reference numeral 20-7 represents a port address (two bits), and the reference numeral 20-8 indicates a register group for storing therein the store data (only for a write request).

From the mask register group 2, the corresponding mask data element is sequentially read as the mask information in synchronism with the request signal 20-1.

In this case, with the instruction which specifies the processing (i) of FIG. 3, the memory location No. 1 of the VMR is selected and the mask information bit stored therein is read out from the mask register group 2. Since the signal obtained by inverting the value of the mask information bit in the memory location No. 1 of VMR is used as the mask information in the processing (i), the read data is inputted to the memory stack 20 through the NOT (inverter) circuit 2-1 and the selector 2-2. Although the mask information bit stored in the memory location No. 1 of VMR is similarly read out with the instruction which specifies the processing (j) of FIG. 3, the mask information need not be inverted, thus the read data is not transferred to the NOT circuit 2-1, that is, it is directly inputted to the memory stack 20 through the selector 2-2.

The reference numeral 20-10 indicates a write pointer, the reference numeral 20-14 represents a read pointer, the reference numerals 20-11 and 20-15 indicate plus-one circuits, the reference numerals 20-16, 20-13, and 20-17 represent decoders, the reference numeral 20-16 indicates an OR circuit, the reference numerals 20-18 to 20-21 represent AND circuits, and the reference numerals 120-1 to 120-4, 120-10 to 120-21, 130-6, 131-6, 132-6, and 133-6 indicate signal lines.

When a request signal is transmitted via the signal line 120-1, the value of the write pointer 20-10 is interpreted by the decoder 20-12 and the request information is stacked in the stack register having the specified register number; furthermore, the value of the write pointer 20-10 is incremented by one in the plus-one circuit 20-11 to prepare the stack register number for the next request.

The value of the read pointer 20-14 is decoded by the decoder 20-13, then the request information is read from the stack register having the specified register number. In this case, the request signal outputted from the register group 20-1 is inputted to the AND circuits 20-18 to 20-21, and the port address transmitted from the register group 20-7 is decoded by the decoder 20-17 and is delivered to the AND circuits 20-18 to 20-21 as depicted in FIG. 13, then these two signals are ANDed. That is, if the request signal is "1", a two-bit port address is obtained by the decode operation, and "1" is outputted from one of the AND circuits 20-18 to 20-21.

When the port address is indicated with "00", "01", "10", or "11", only one of the corresponding outputs on the signal lines 120-16 to 120-19 becomes "1", respectively; and the output is transmitted as a port request signal to the port 32, 33, 30, or 31, respectively. At the same time, the mask information, read/write identification information, access request source information, high-order address, bank address, and store data are transmitted to all of the ports 30-33 through the signal lines 120-11, 120-12, 120-13, 120-14, 120-15, and 120-20, respectively.

The port requests transmitted to the ports 30-33 are checked to determine their priority with respect to the port requests from the other request stacks and transmitted to the corresponding memory devices. Then the accept signal indicating that the memory request has been transmitted to the corresponding memory device is returned from the ports 32, 33, 30, and 31, respectively via the signal lines 132-6, 133-6, 130-6, and 131-6 to the corresponding request stack. These signals are ORed in the OR circuit 20-16 and the resultant signal is inputted to the plus-one circuit 20-15 through the signal line 20-21 to be used to increment the value of the read pointer 20-14 by one. The signal ine 120-21 also transfers the signal to the corresponding requester to notify that the transmitted request has been processed (enabling to transmit another request if necessary).

FIGS. 14a, 14b, and 14c depict examples in detail of the high-order address, bank address, and the port address, respectively. If it is assumed that the memory capacity is 4 GB and the memory address is indicated in byte units, an address information must comprise 32 bits in this case. Furthermore, the data processing unit (for instance, the vector data element) for the memory access is eight bytes and the three low-order bits of the memory address is to be ignored (or is assumed to be all "0").

FIG. 15 illustrates the configuration of the port 32. The same function is also provided for the ports 30, 31, and 33. Referring to FIG. 15, the reference numerals 32-1 to 32-4 indicate the request transmission determiner circuits which determines the condition for transmitting a request to the memory device 1-1 by inputting the port request signal, mask information, and bank address transmitted from the request stacks 20 to 23, respectively and the bank busy signals outputted from the bank busy circuit 32-9 through the signal lines 132-5-1 to 132-5-8; the reference numerals 32-5 to 32-10 indicate a priority circuit, an OR circuit, a selector, an AND circuit, a bank busy circuit, and a register; and the reference numerals 132-1 to 132-4, 132-5-1 to 132-5-8, and 132-6 to 132-22 represent the signal lines.

FIG. 16 illustrates the configuration of the request transmission determiner circuit 32-1 (as well as the request transmission determiner circuits 32-2 to 32-4) comprising NOT circuits 32-50 to 32-58, AND circuits 32-59 to 32-67, an OR circuit 32-68, and a decoder 32-69. The three-bit bank address transferred via the signal line 120-15 is decoded by the decoder 32-69. When the decoded value is "000", "001", . . . , or "111"; the bank 1, 2, . . . , or 8 is specified, respectively; and the resultant signal is inputted to one of the AND circuits 32-60 to 32-67, accordingly. Furthermore, bank busy signals for the banks 1 to 8 outputted from the bank busy circuit 32-9 are inputted to the AND circuits 32-60 to 32-67, respectively through the signal lines 132-5-1 to 132-5-8 and the NOT circuits 32-51 to 32-58, respectively. These input signals and the port request signal transferred through the signal line 120-16 are ANDed, then the resultant output signals are inputted to the OR circuit 32-68. The mask information transferred via the signal line 120-11 is inverted by the NOT circuit 32-50, and the inverted signal is ANDed with the port request signal by the AND circuit 32-59, then the ANDed output is transferred to the input of the OR circuit 32-68.

That is, a signal "1" is outputted from the OR circuit 32-68 via the signal line 132-1 if the port request signal is "1" and the bank busy signal is "0" (indicating that the relevant bank is not busy) for the bank number specified with the bank address, or if the port request signal is "1" and the mask information is "0". The latter condition indicates that the request can be transmitted regardless of the bank utilization state because the mask information is "0".

The request transmission enable signals for each request stack outputted from the request transmission determiner circuits 32-1 to 32-4 via the signal lines 32-1 to 132-4, respectively are accepted by the priority circuit 32-5 in accordance with a predetermined priority. The priority circuit will not be described in detail; however, in a situation in which a priority number is assigned to each request transmission enable signal inputted to the priority circuit and there exists a plurality of request transmission enable signals to be input thereto, it can be considered to control the signal acceptance in the descending priority number order.

The signal lines 132-6 to 132-9 are set to "1" when accepted for the port request signals from the request stacks 20-23, respectively, and these signals are transmitted as before-stated accept signals to the corresponding request stacks, respectively.

Moreover, these signals are inputted to the selector 32-7 and are used to select the request information from the corresponding request stack and the selected information is set to the register 32-10, then the mask information, read/write identification information, access request source information, high-order address, bank address, and store data are transmitted to the memory device 1-1 through the signal lines 132-17 to 132-22, respectively.

The request transmission enable signals outputted via the signal lines 132-1 to 132-4 are ORed by the OR circuit 32-6, and the ORed output signal is transmitted to the memory device 1-1 as the memory request signal via the signal line 132-16. The signal line 132-10 is further connected to the AND circuit 32-8 and is ANDed with the signal line 132-11 from which the mask information is outputted, then the ANDed output signal inputted to the bank busy circuit 32-9 through the signal line 132-15. At the same time, the bank address is inputted to the bank busy circuit 32-9 via the signal line 32-13. That is, only when any one of the request transmission enable signals is "1" and the mask information is "1", the signal line 132-15 is set to "1" and the bank having the bank number specified by the bank address inputted from the signal line 132-13 is made busy for a time period comprising the necessary number of cycles. If the mask information is "0", the bank is not set to the busy state.

FIG. 17 depicts the configuration of the memory device 1-1 (the other memory devices are also configured in the same manner) comprising an order pipeline 1-1-2, a decoder 1-1-3 for decoding the three-bit bank address, a NOT circuit 1-1-4, AND circuits 1-1-5 to 1-1-23 (AND circuits 1-1-11 to 1-1-20 are not shown), a selector 1-1-24, memory banks 1-1-25 to 1-1-32 (memory banks 1-1-27 to 1-1-31 are omitted), and signal lines 11-1-1 to 11-1-4.

A three-bit bank address transferred via the signal line 132-21 is decoded by the decoder 1-1-3, and the decoded signal is inputted to the AND circuits 1-1-7 to 1-1-22; while the memory request signal transferred through the signal line 132-16 is ANDed with the mask information transferred through the signal line 132-17 by the AND circuit 1-1-5, then the obtained output signal is supplied to the AND circuits 1-1-7 to 1-1-22. Furthermore, the read/write identification information transmitted via the signal line 132-18 is inverted by the NOT circuit 1-1-4 and the resultant inverted signal is inputted to the AND circuits 1-1-7, 1-1-9, 1-1-11, . . . , 1-1-21.

Then, these input signals are ANDed therein and the output signals are delivered as the read initiate signals to the memory banks 1-1-25 to 1-1-32, respectively. The identification information described above is directly inputted to the AND circuits 1-1-8, 1-1-10, . . . , 1-1-22, and the resultant output signals are used as the write initiate signals to the memory banks, respectively.

At the same time, the high-order address and the store data (only for a write request) transferred through the signal lines 132-20 and 132-22 are also inputted to each memory bank. The read valid information ("1" indicates that there exists a dread request) outputted from the AND circuit 1-1-6, the data valid information (outputted from the AND circuit 1-1-23) which is set to "1" when the read valid information delivered from the AND circuit 1-1-16 is "1" and the mask information via the signal line 132-17 is "1", the access request source information from the signal line 132-19, and the bank address from the signal line 132-21 are inputted to the order pipeline 1-1-2.

Through the pipeline stage operations of which the time period is equal to the number of cycles enough to access a memory bank, the selector circuits 40-43 are supplied with the read valid information as the write address update signal via the signal line 11-1-1, the data valid information as the write signal enable signal via the signal line 11-1-2, the access request source information via the signal line 11-1-3, and one of the data signals outputted from memory banks and selected as the read data based on the bank address by the selector 1-1-24 via the ssignal line 11-1-4. Each selector circuit 40 to 43 interprets the two bits of the access request source information to determine whether or not the information is to be obtained. If this is the case, the write address update signal, write enable signal, and the read data are obtained, then they are transferred to the access request source, respectively. With an execution of an instruction for specifying the processing ⓘ of FIG. 3, for instance, the read data corresponding to the request signal issued from the memory requester 10 is fetched into the relevant selector circuit 40. The fetched read data is transferred via the data pass select circuit 3-100 and is stored in the first vector register (VR1) of the vector register group 3. At the same time, in synchronism with the read data, the write address update signal and the write enable signal are also transferred to the first vector register. The write address update signal indicates to increment (by one) the content of the pointer which specifies the vector memory location number for storing data in the vector register, thereby setting the memory location number for storing the next read data to be transferred. The write enable signal indicates whether or not the transferred read data is to be stored in the memory location specified by the content of the store memory location number pointer before it is incremented by one with the write address update signal.

The vector data read out from the memory in the order of the ascending memory location numbers are, in this manner, stored sequentially in the vector registers under control of the write address update signal and the write enable signal.

Although the information which generates the write enable signal, write address update signal, request issue source information, and the like is supplied to the order pipeline in the memory device, this need not be necessarly disposed in the memory device, that is, the provision can be also disposed in any device that assurres the identical functions thereof.

As can be clear from the foregoing description, the present invention makes it possible to read only the vector elements necessary for the processing, thereby realizing an efficient processing.

We claim:

1. A storage control apparatus comprising:
    a main storage device for storing at least one data block including a plurality of vector elements said main storage device having a plurality of memory banks and being configured so that then any one of said memory banks is activated for a read operation, the next access thereto is rejected until a vector element is read out with said read operation;
    at least one vector register means connected to said main storage device, said at least one vector register means including a plurality of storage locations in which said a plurality of vector elements in said data block which are sequentially read out from said main storage device can be written;
    mask register means for storing mask information which indicates for each said vector element whether or not each one of a plurality of vector elements sequentially read out from said main storage is required to be written in said vector register means; and
    control means connected to said main storage device, said vector register means, and said mask register means for reading a plurality of vector elements and said mask information from said main storage and said mask register means, respectively, and for sequentially writing said plurality of vector elements and said mask information in said vector register means; said control means including means for inhibiting said vector register means from writing said data element in the corresponding one of said storage locations when said mask information corresponding to one of said vector elements indicates that the write operation is not required.

2. A storage control apparatus according to claim 4, wherein said control means includes:
    means for generating a first control signal each time one of said vector elements is read from said main storage; and
    means for receiving said mask information from said mask register means and for generating a second control signal which indicates whether or not one of said vector elements read from said main storage is required to be written in the corresponding one of said memory locations of said vector register means each time one of said vector elements is read from said main storage device; wherein said vector register means includes:
    pointer means for indicating an address of a storage location in which said readout vector element is to be stored;
    means for updating a write address indicated by said pointer means each time said first control signal in inputted, and
    means inhibiting said readout vector element from being written in said storage location having said address indicated by said pointer means.

3. A storage control apparatus according to claim 1, wherein said control means is configured so as to operate through a plurality of pipeline stages.

4. A storage control apparatus according to claim 3, wherein the number of cycles which appear from a time when one of said memory banks is activated for a read operation to a time when a vector element is read out with said read operation in said main storage device is equal to the number of said pipeline stages of said control means.

5. A storage control apparatus according to claim 3, wherein said control means further includes means for disabling a read initiation for one of said banks corresponding to one of said vector elements in said main storage device when said mask information corresponding to said one of said vector elements to be read indicates that a read operation is unnecessary for said one of said vector elements.

6. A storage control apparatus comprising:
a plurality of main storage devices including a plurality of memory banks for storing therein at least one vector data block comprising a plurality of vector elements;
a plurality of vector register means, each of said plurality of vector register means having a plurality of storage locations in which each of said a plurality of vector elements in said at least one vector data block sequentially read from one of said plurality of main storage devices can be stored;
a plurality of mask register means, each said a plurality of mask register means provided for each of a plurality of memory access sources for storing mask information which indicates for each said vector element whether or not it is necessary to store a plurality of vector elements sequentially read from a plurality of memodry storage devices in reply to requests issued from associated one of said memory access sources into the corresponding one of said vector register means;
a plurality of request stacks, each of said plurality of request stacks being provided for storing a request information signal from one of said access request sources after adding said mask information from an associated one of said mask register means to said request information signal;
a plurality of memory port means, each of said plurality of memory port means being connected to all of said request stacks for receiving said request information signal from the associated one of said main storage devices among said request information signals generated by all said request stacks;
a plurality of control means each provided for each of said plurality of main storage devices, respectively, each said a plurality of control means being connected to one of a plurality of memory ports for sequentially reading each said vector element from the corresponding one of said vector data blocks based on request information signal from the associated one of said memory ports, and for inhibiting the corresponding vector register means to write said vector element when said mask information added to said request information indicates that a write operation is unnecessary for said vector element; and
a plurality of selector means provided for each of said a plurality of control means, respectively, each said selector means being connected to all said a plurality of vector register means for transmitting to the corresponding one of said vector register means said control signal generated by the associated one of said control means and said vector element read from the associated one of said main storage devices.

7. A storage control apparatus comprising:
a storage device for storing a plurality of vector data each including a plurality of vector elements;
a plurality of vector register means connected to said storage device, each vector register means including a plurality of memory locations in which said plurality of vector elements of one of a vector data stored in said storage device can be written, respectively;
memory requester means for generating a read address to to designate a vector data in said storage device, and read request to said storage device;
vector mask register means for storing each mask information corresponding to each vector element of a vector data designated by a read address from said memory requester means, each mask information indicating whether or not a corresponding vector element of the designated vector data is required to be written in a desired one of said vector register means;
counter means connected to said vector register means, for sequentially indicating a memory location of said desired vector register means;
write means connected to said counter means and said vector register means, for writing a vector element of the designated vector data in a corresponding memory location of said desired vector register means indicated by said counter means; and
control means connected to said storage device, said memory requester means, said write means, said vector register means and said vector mask register means, and responsive to the mask informations successively inputted thereto in synchronism with the generations of the read addresses and the read requests by said memory requester means, for accessing said storage device to read out a vector element of the designated vector data corresponding to the inputted mask information at least when said mask information has a first value representing that the write operation is required;
said control means transmitting the read-out vector element of the designated vector data together with a write command signal to said desired vector register means, and a signal for incrementing said counter means, when the corresponding mask information has a first value;
said control means generating only the signal for incrementing said counter means without the write command signal, when the corresponding mask information has a second value representing that the write operation is not required.

8. A storage control apparatus according to claim 7, wherein said control means accesses said storage device to read out all of the vector elements of said designated vector data irrespective of the values of said mask informations.

9. A storage control apparatus according to claim 7, wherein said control means accesses said storage device to selectively read out the vector elements of said designated vector data only when said mask informations have the first values.

10. A storage control apparatus according to claim 7, wherein said storage device comprises a plurality of memory banks and is configured so that when any one of said memory banks is activated for a read operation, the next access thereto is rejected until a data element is read out with said read operation.

11. A storage control apparatus according to claim 9, wherein said control means is configured so as to operate through a plurality of pipeline stages, even when said mask informations has the second values.

12. A storage control apparatus according to claim 11, wherein the number of cycles which appear from a time when one of said memory banks is activated for a read operation to a time when a vector element is read out with said read operation in said storage device is equal to the number of said pipeline stages of said control means.

13. A storage control apparatus according to claim 11, wherein said control means further includes means for disabling a read initiation for one of said vector elements in said main storage device when said mask information corresponding to said one of said vector elements to be read indicates that a write operation is unnecessary for said one of said vector elements.

14. A storage control apparatus comprising:
  a storage device including a plurality of memory banks for storing therein vector data each having a plurality of vector elements;
  a plurality of vector register means each having a plurality of memory locations in which said plurality of vector elements of one of a vector data stored in said storage device can be written, respectively;
  a plurality of mask register means, each of said mask register means being provided for each of a plurality of memory access request sources and being provided for storing therein a mask information which indicates for each said memory location whether or not it is necessary to store a corresponding one of said vector elements in a corresponding one of said vector register means in reply to requests issued from associated one of said memory access request sources;
  a plurality of request stacks, each of said request stacks being provided for storing therein a request information signal from one of said access request sources after adding said mask information from associated one of said mask register means to said request information signal;
  a plurality of memory port means, each thereof being connected to all said request stacks and being provided for receiving said request information signal from the associated one of said memory banks among the request information signals generated by all said request stacks;
  a plurality of control means provided for said a plurality of memory blocks, respectively, each of said control means being connected to one of a plurality of memory ports, responsive to said mask informations and said request information, for disabling a corresponding memory bank to read the vector element when said mask information added to said request information indicates that a write operation is unnecessary for the vector element; and
  a plurality of selector means provided for said a plurality of control means, respectively, each of said selector means being connected to all said vector register means for transmitting to the corresponding one of said vector register means, a control signal generated by the associated one of said control means, and a vector element read from the associated one of said memory blocks.

15. A storage control apparatus according to claim 7, wherein said control means is configured so as to operate through a pipeline stage.

* * * * *